United States Patent Office 3,582,359
Patented June 1, 1971

3,582,359
GUM CONFECTIONS CONTAINING 5–15 D.E.
STARCH HYDROLYZATE
Harold Edwin Horn, Oak Lawn, and Bruce Alan Kimball, Chicago, Ill., assignors to CPC International Inc.
No Drawing. Filed Oct. 30, 1968, Ser. No. 771,982
Int. Cl. A23g 3/00
U.S. Cl. 99—134　　　　　　　　　　　　　12 Claims

ABSTRACT OF THE DISCLOSURE

Low D.E. starch hydrolysates having D.E.'s of about 5 to 25 replace up to 70% of the sweetening constituent, e.g. sucrose and/or corn syrup, in a gum confection to thereby reduce drying time and improve resiliency, strength, firmness, and tenderness.

This invention relates to gum confections. More particularly this invention relates to improved gum confections and methods of making same by replacing a portion of the sweetening constituent therein with a low D.E. starch hydrolysate.

Gum confections, or by another name, starch jellies, are well known in the art and their well known definition is incorporated herein by reference. Examples of these gum confections include gum drops, gum slices, jelly beans, gum centered candies, and the like.

Gum confections are generally comprised of three basic constituents, (a) a sweetening constituent, (b) starch, and (c) water. Other ingredients include various flavoring materials, preservatives, coloring agents, and the like. The term "sweetening constituent" is used herein to define those ingredients which are included in a gum confection to add sweetness to the confection. For most conventional gum confections, the sweetening constituent is comprised of sucrose and/or corn syrup. In special situation, other sweeteners, including artificial sweeteners, may be used.

Gum confections comprised of the above-described three basic ingredients are usually formed by first cooking starch with water and the sweetening constituent until the starch is gelatinized, forming a liquid hereinafter referred to as a syrup. The starch used may be any well known starch, corn starch being preferred. As stated above, the sweetening constituent is usually sucrose and/or corn syrup. The hot syrup so formed by the cooking step is next shaped and dried to set up a gel, whereupon a final product is produced.

Even under the most rigorously and efficiently controlled commercial techniques currently used to effect the above-described process for making gum confections, drying times are excessively long. Such inordinately prolonged drying procedures not only reduce production but necessitate the use of excessive space and drying molds which could otherwise be "recycled" into the production line.

For example, in one typical commercial technique for making gum confections the starch is cooked at atmospheric pressure in a sugar solution containing excess water, and the mixture is then subjected to a rolling boil until sufficient water is lost by evaporation to yield a syrup of the proper consistency. The end points are judged by a skilled candy maker by dipping a paddle into the hot syrup and observing the clarity and the consistency of the syrup as it drains from the paddle in a flat, sheet-like form. In more modern methods for making gum confections, the requisite amounts of starch, sugar, corn syrup and water are cooked under pressure to super temperatures by steam injection or by use of a heat exchanger. This technique permits cooking on a continuous basis rather than by batches and additionally only requires the amount of water necessary to gelatinize the starch so as to form a syrup. Thus, the cooking time may be reduced.

After cooking, the subsequent steps in the process have remained virtually unchanged and unimproved for many years. The cooked syrup is continuously deposited in small measured portions into depressions in a bed of dry powdered molding starch which is contained in shallow trays. The surface of the bed of molding starch is first smoothed over and then imprinted with depressions of the desired shape, i.e., the crescent shaped orange slices or round hemi-spherical form of the conventional gum drop. The trays of molding starch generally are carried on a continuous belt and the hot syrup resulting from the cooking operation is automatically injected, as by depositing hopper, into the preformed depression. The freshly deposited gum confection is relatively soft and semi-fluid, and even when cooled, a considerable aging period is necessary for the development of desired gel structure. Desired gel structure is developed by formation first of an interior core and then by a light skin on the exterior. Upon sufficient skinning and core development, the confection may be removed from the mold but generally will still require further setting time to retain a permanent shape. Therefore, the gum confection frequently is allowed to remain in the mold until final shape is attained, whereby the gum confection is sanded (sugared) and packaged. The necessary total drying time frequently reaches from one to several days. As stated above, such prolonged drying times are expensive and space consuming.

During drying several desired changes occur. For instance: (1) the deposited starch-sugar syrup gradually sets up to a firm gel, (2) the starch sugar syrup gradually loses water to the bed or molding starch, and (3) the surface of the gum confection gradually develops the desired properties of gloss and smoothness as well as a firmness sufficient for subsequent panning or sugaring operations in final packaging.

To facilitate water exchange between the gel and the starch, the molding starch may be predried to approximately 5% to 8% moisture content, under which circumstances it gradually removes water from the confection, thus facilitating the development of a gel structure therein. If the temperature of the conditioning room is exceptionally high, the predrying of the molding starch is not necessary since moisture in the confection will migrate through the starch into the hot air.

After conditioning for the necessary period of time to effect the above desired characteristics (usually in the range from 24 to 72 hours at temperatures from ambient to about 70° C.) the gum confections are screened from the molding starch, panned or "sanded," i.e. given a coating of crystalline sugar, and packaged. The molding starch must then be redried to the requisite low moisture content for reuse.

In order for the final products so formed to be commercially acceptable, they must exhibit the necessary levels of tenderness, firmness, resiliency, and strength. Although the prior art has generally been able to obtain acceptable products through careful production control there is a definite need for improved gum confections and more economic processes for making them.

It is a purpose of this invention to fulfill the above need in the art by providing novel gum confection compositions, products, and methods of making the same. The gum confections of this invention not only require materially shorter drying times than those heretofore used, but also exhibit acceptable and, in many instances, superior levels of firmness, resiliency, tenderness, and strength.

Basically, the gum confection compositions contemplated by this invention comprise starch, water, a sweetening constituent, and a significant portion of a low D.E. starch hydrolysate. Conventional additives such as flavoring agents, preservatives, coloring agents and the like may also be included.

Generally speaking, these novel compositions may be formed by using water, starch, and other ingredients in the amounts heretofore prescribed by the prior art but with the substitution of up to about 70% by weight of the sweetening constituent with low D.E. starch hydrolysate such that the total weight of the sweetening constituent and the hydrolysate equals the amount of sweetening constituent heretofore prescribed. Preferably the hydrolysate replaces from about 6% to about 60% by weight of the sweetening constituent and most preferably about 12% by weight of the sweetening constituent.

In most instances the sweetening constituent of the gum confection compositions of this invention comprise sucrose and/or corn syrup. While other sweeteners are also contemplated for use in this invention, sucrose, corn syrup and mixtures thereof are preferred.

The starch which may be used in the confections of this invention may be any well known starch conventionally used in gum confections generally. Preferably, however, corn starch is used. Most preferably, the corn starch has a fluidity of 40-70, and/or is cross-bonded, derivatized or otherwise modified to provide the desired gel strength and thermal gelation for facilitation in processing.

A typical example of a gum confection composition as contemplated by this invention comprises by weight composition, from about 0% to about 65% corn syrup (80-82% solids generally), about 0% to about 50% sucrose, about 8% to about 15% starch (dry basis), about 10% to about 12% water (exclusive of water present in the corn syrup), and about 5% to about 55% starch hydrolysate. Preferably the hydrolysate is present in an amount of about 5% to 50%, and most preferably about 10%.

The starch hydrolysates used in the confections of this invention are a relatively new class of starch materials. These starch hydrolysates are made by subjecting a source of starch to enzyme or acid treatment or a combination of both. It is important that the starch hydrolysate have a relatively low D.E. (dextrose equivalent) of say less than about 25 and most preferably have a D.E. in the range from 5 to 25. The most preferred materials have a D.E. within the range of 5 to 15. Starch hydrolysates of this type have been found to be excellent agents useful in reducing moisture pick-up of normally hygroscopic edible foods whereas use of other hydrolysates having a D.E. substantially outside this range results in inferior products which show a tendency to become sticky.

The term D.E. is used herein to refer to the reducing sugars content of the dissolved solids in a starch hydrolysate expressed as percent dextrose as measured by the Luff-Schoorl method (NBS Circular C–40, page 195 as appearing in "Polarimetry, Saccharimetry, and the Sugars" authors Frederick J. Bates and Associates).

The initial starch which is subjected to hydrolytic treatment may be derived from a wide variety of starchy materials such as cereal starches, waxy starches, and/or root starches. Typical of these groups are corn starch, potato starch, tapioca starch, grain sorghum starch, waxy milo starch, waxy maize starch, rice starch and the like. The term "starch hydrolysate" as used herein encompasses hydrolyzed starchy materials derived from a wide variety of starch sources known in the industry.

As hereinbefore stated, the starch hydrolysates preferred for use in the present invention are those having a D.E. ranging from about 5 to about 25 and which are made by any number of specific methods.

In one method, referred to as Method A in Example 1, a starch such as waxy starch is treated with a single enzyme application of bacterial alpha amylase. More specifically, an aqueous slurry of a waxy starch, having a solids content less than 50%, is subjected to the hydrolytic action of bacterial alpha amylase under suitable conditions of fermentation to produce a starch hydrolysate. The hydrolysate may be further characterized as having the sum of the percentages (dry basis) of saccharides therein with a degree of polymerization of 1 to 6 divided by the D.E. to provide a ratio greater than about 2.0. This ratio is referred to as the characteristic or descriptive ratio. Those low D.E. products having a descriptive ratio less than about 2 are somewhat undesirable in that they exhibit less water solubility and also tend to form haze in solution as compared to those products with a ratio of at least 2.

The same product as described above, may also be made via a number of other routes. For example, a mixture of starch and water having a solids content less than 50% may be first subjected to the hydrolytic action of a bacterial alpha amylase followed by a high temperature heating step to solubilize any unsolubilized starch. Since this temperature tends to inactivate the enzyme it is then necessary to cool the solubilized partial hydrolysate and subject it to a second hydrolysis by treatment with additional bacterial alpha amylase to obtain the final starch hydrolysate. This technique is referred to as Method B in Example 1.

A third method of making the preferred class of low D.E. starch hydrolysates referred to as Method C in Example 1, consists of hydrolyzing a mixture of starch and water by the action of acid to reach a D.E. between about 5 and about 15. The partial hydrolysate is subsequently subjected to the action of bacterial alpha amylase to obtain a starch hydrolysate having a D.E. of from about 10 to about 25.

A particularly preferred starch hydrolysate useful in the present invention has the following specifications: moisture content about 5% maximum and a D.E. from 10–13. Alternatively, the hydrolysate may be in the form of a syrup of about 76% solids.

The above-described gum confection compositions of this invention may be readily and easily formed into a gum confection product by using the same conventional steps heretofore described for producing gum confections generally. For example, one technique which may be used comprises initially forming a solution by mixing the corn syrup and water together. To this solution there is then added with mixing, the sucrose and low D.E. starch hydrolysate until the hydrolysate is thoroughly dispersed. The starch is then added and the resulting slurry is mixed with constant agitation at a temperature of about 150–190° F. to insure complete mixing and wetting of the starch. The slury is then cooked in a continuous cooker at a temperature above about 250° F. and at a feed rate of about 0.2 gallon/minute. The cooled composition is then placed in molds of predried starch having a moisture content of approximately 5% to 8%, and dried at ambient temperature.

As hereinbefore stated, drying times for the compositions of this invention are materially reduced. That is to say, drying times for the confections of this invention are usualy substantially less than about 72 hours. In most instances the drying times are substantially less than 50 hours and in many instances are actually less than about 24 hours. In any case, the partial replacement of the sweetening constituent with hydrolysate will reduce the drying time required for a particular composition.

After drying, the gum confections formed are found to possess the necessary smoothness, gloss, and firmness sufficient for subsequent panning or sugaring operations. After panning or sugaring the confections are packaged as desired. The products so formed exhibit acceptable, and oft-times, substantially superior levels of firmness, resiliency, tenderness and strength.

It is understood, of course, that many modifications and other techniques may be used to formulate the gum confection compositions of this invention into final gum confection products. Generally speaking, all conventional processes and techniques that are currently used to form conventional gum confections, may be used to form the novel gum confections of this invention.

The following examples are presented to better illustrate the invention rather than to limit it.

EXAMPLE 1

The following specific procedures illustrate the above-described three basic methods for making the low D.E. starch hydrolysates used in this invention.

Method A—one step enzyme technique

An aqueous starch slurry was prepared containing 30% solids by weight of waxy milo starch. The temperature of the slurry was raised and held between 85° C. and 92° C. A bacterial alpha amylase preparation was added in an amount just above 0.025% by weight of the starch over a period of slightly more than 30 minutes. The mixture was then held at the same temperature for an additional period of 30 minutes. The temperature was then reduced to below 80° C. and the conversion was allowed to continue until the desired D.E. was reached. The temperature of the mixture was then suddenly raised to about 120° C. in order to inactivate the enzyme and terminate the conversion.

Table 1 below sets forth typical saccharide analyses of low D.E. hydrolysates obtained in accordance with the above procedure. DP designates the range of polymerization. $DP_1$ represents the total quantity expressed in percent by weight dry basis of monosaccharides present in the hydrolysate. $DP_2$ represents the total quantity of disaccharides present in the hydrolysate and so forth.

TABLE 1.—TYPICAL SACCHARIDE ANALYSES

| | D. E. | | | | |
|---|---|---|---|---|---|
| | 5 | 10 | 15 | 20 | 25 |
| Hydrolysate composition: | | | | | |
| $DP_1$ | 0.1 | 0.3 | 0.7 | 1.4 | 2.4 |
| $DP_2$ | 1.3 | 3.4 | 5.3 | 7.6 | 9.7 |
| $DP_3$ | 1.8 | 4.3 | 6.9 | 9.4 | 12.0 |
| $DP_4$ | 1.8 | 3.5 | 5.2 | 6.9 | 8.6 |
| $DP_5$ | 1.8 | 3.6 | 5.5 | 7.4 | 9.3 |
| $DP_6$ | 3.3 | 7.0 | 10.6 | 14.3 | 18.0 |
| $DP_7$ and higher | 89.9 | 77.9 | 65.6 | 53.0 | 40.0 |
| Total $DP_1 \to _6$ | 10.1 | 22.1 | 34.4 | 47.0 | 60.0 |
| Descriptive ratio | 2.0 | 2.2 | 2.3 | 2.4 | 2.4 |

Method B—two step enzyme-enzyme technique

Unmodified corn starch was slurried in water to provide an aqueous suspension containing 28–32% by weight of the unmodified corn starch. The pH was at 7.5–8.0. To this mixture was added HT–1000 bacterial alpha amylase (manufactured and sold by Miles Chemical Laboratories) in an amount of 0.05% based on starch solids. This starch suspension was added over a 30 minute period to an agitated tank maintained at a temperature of 90–92° C. After completion of starch addition, liquefaction was continued for 60 minutes, at which time the hydrolysate was within the D.E. range of 2 to 5. The liquefied starch was then heated to 150° C. and held at this temperature for 8 minutes. The heat treatment destroyed residual enzyme activity and resulted in improved filtration rates and in decreased yield losses upon filtration.

Further saccharification to the final D.E. was accomplished by the addition of more HT–1000 bacterial alpha amylase after cooling the liquefied starch hydrolysate to a suitable temperature for conversion. The liquefied starch was cooled to 80–85° C. and HT–1000 added in an amount of 0.02% by weight starch solids. After 14 to 20 hours of conversion the desired terminal D.E. of 20 was obtained.

The final starch hydrolysate product was analyzed and the following analytical values were obtained.

TABLE 2

| | |
|---|---|
| D.E. | 20.7 |
| $DP_1$ | 2.4 |
| $DP_2$ | 7.5 |
| $DP_3$ | 10.8 |
| $DP_4$ | 8.0 |
| $DP_5$ | 6.8 |
| $DP_6$ | 15.1 |
| $DP_{7+}$ | 49.4 |
| Descriptive ratio | 2.4 |

Method C—two step, acid-enzyme technique

Several samples of corn starch (A, B and C) were slurried in water providing slurries having Baumés' ranging from 14° to 22°. These slurries were partially acid hydrolyzed to a maximum of 15 D.E. The particular D.E. achieved by acid hydrolysis in each of the samples is set forth in Table 3 below. After acid hydrolysis, the slurry was neutralized to a pH between 6 and 7. The neutralized liquor was cooled to between 80 and 85° C., and dosed with bacterial alpha-amylase (HT–1000) in the quantity set forth below. A final D.E. of 19 to 21 was obtained in each of the samples in a period of time between 1 and 3 hours. The final conversion liquors are low in color. These liquors are easily refined and evaporated to about 42° Baumé to provide syrups. Dry products may also be obtained. Tables 3 and 4 below set forth the reaction conditions for conversion and the product analyses respectively.

TABLE 3.—ENZYME CONVERSION CONDITIONS

| | D.E. of acid hydrolysate | Percent dry substance | Temp., ° C. | pH | Enzyme, dose | Time, hours | Final, D.E. |
|---|---|---|---|---|---|---|---|
| Sample: | | | | | | | |
| A | 15.2 | 38 | 80 | 6.5 | 0.06 | 1 | 17.9 |
| B | 12.9 | 37.6 | 85 | 6.5 | 0.05 | 2 | 20.2 |
| C | 10.7 | 38.1 | 85 | 6.5 | 0.1 | 2 | 21.8 |

TABLE 4.—PRODUCT ANALYSES

| | Final, D.E. | Percent dry substance | $DP_1$ | $DP_2$ | $DP_3$ | $DP_4$ | $DP_5$ | $DP_6$ | $DP_{7+}$ | Descriptive ratio |
|---|---|---|---|---|---|---|---|---|---|---|
| Sample: | | | | | | | | | | |
| A | 19.7 | 72 | 3.9 | 5.8 | 8.3 | 7.2 | 7.3 | 10.2 | 57.4 | 2.1 |
| B | 20.2 | 72 | 2.3 | 5.9 | 8.5 | 6.4 | 6.6 | 12.6 | 57.7 | 2.1 |
| C | 21.8 | 75 | 2.3 | 8.3 | 10.9 | 8.1 | 9.2 | 16.9 | 44.3 | 2.5 |

EXAMPLE 2

In order to demonstrate the superiority of the confections of this invention various sample gum confections were made.

The first gum confection was formulated from a standard and well accepted confection recipe using by weight composition, 47.4% corn syrup (82% solids), 31.2% sucrose, 10.4% (dry basis) corn starch (67 fluidity), and 11.0% water. This confection is referred to in Table 5 as the control.

The second type of gum confection was formulated by replacing different amounts of the sucrose and/or corn syrup in the control composition with a starch hydrolysate produced according to Method A, Example 1 from waxy milo starch and having a D.E. of about 10. The hydrolysate exhibited substantially the same composition characteristics as the 10 D.E. starch hydrolysate in Table 1. This confection is referred to in Table 5 as confection A.

The third type of gum confection (composition B in Table 5) was formulated by replacing 30% by weight of either the sucrose or the corn syrup in the control composition with a starch hydrolysate produced from corn starch according to Method B, Example 1 and having a D.E. of about 10 and a descriptive ratio greater than 2.0.

All confections were formulated by the same prescribed technique of initially dispersing the corn syrup in the water. Next the sucrose, and hydrolysate (if any) were admixed in the solution and thoroughly dispersed therein. The starch was then added and the resulting slurry mixed with constant agitation for 45 minutes at a temperature ranging from 185°–195° F. to insure complete mixing and wetting of the starch. The slurry was then cooked in a continuous cooker at 295° F. and at a slurry feed rate of 0.2 gallon/minute. The cooked compositions at approximately 79% solids, were then placed in predried starch molds and were dried at ambient room temperature until the starch gum confections were capable of being removed and sanded in a conventional manner. The following comparative data were recorded. The characteristics of resiliency, strength, firmness, and tenderness are rated on a four point system as follows:

(1) poor
   (2) fair
   (3) good
   (4) excellent

The symbol "a" following a rating in the tenderness test signifies excessive skin toughness (suitable for the chewy type gum confection), the symbol "b" excessive core tenderness.

rated poor they are still quite acceptable and in some instances more desirable for some specialty gum confection products, such as the chewy type.

EXAMPLE 3

In another example, hydrolysate having a D.E. of 15 in the form of a syrup containing 76% solids is used in an amount dry basis, such that the hydrolysate replaces 30% of the uscrose. Because of the water contained in the syrup, it is necessary to reduce the water added to the gum confection mix by an equal amount.

Gum confections produced by the same method as Example 2 using a hydrolysate in syrup form, exhibit the name excellent qualities as those of Confection A in Example 2.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A gum confection comprising from about 10% to about 15% by weight of starch, about 10% to about 12% by weight of water, about 5% to about 55% by weight of a starch hydrolysate having a D.E. from about 5 to about 15 and a descriptive ratio of at least about 2.0, and a sweetening constituent selected from the group consisting of corn syrup, sucrose and mixtures thereof.

2. A gum confection composition according to claim 1 wherein said starch hydrolysate has a D.E. from about 10 to about 13.

3. A gum confection composition according to claim 1 wherein said sweetening constituent comprises from about 0% to about 65% corn syrup and about 15% to about 50% sucrose.

4. A gum confection composition according to claim 1 wherein said starch hydrolysate is present in an amount of about 10% by weight of said composition.

5. A gum confection comprised of starch, water, a sweetening constituent selected from the group consisting

TABLE 5

| | Control | Confection A | | | | Confection A | | | | Confection B | Confection A | | |
|---|---|---|---|---|---|---|---|---|---|---|---|---|---|
| Percent sucrose replacement (by weight) | 0 | 15 | 30 | 45 | 60 | 0 | 0 | 0 | 0 | 30 | 0 | 15 | 0 |
| Percent corn syrup replacement (by weight) | 0 | 0 | 0 | 0 | 0 | 15 | 30 | 45 | 60 | 0 | 30 | 15 | 100 |
| Percent deposited solids | 78.9 | 79.0 | 79.5 | 80.5 | 78.7 | 78.4 | 79.2 | 79.5 | 78.7 | 79.5 | 79.2 | 79.5 | 77.7 |
| Slurry tank temp., ° F | 190 | 190 | 190 | 195 | 185 | 195 | 185 | 195 | 190 | 185 | 190 | 190 | 190 |
| Cook temp., ° F | 295 | 295 | 295 | 295 | 295 | 295 | 295 | 295 | 295 | 295 | 295 | 295 | 295 |
| Drying time, hours | 55 | 30 | 24 | 22 | 21 | 44 | 44 | 44 | 44 | 24 | 44 | 44 | 18 |
| Comments: | | | | | | | | | | | | | |
| Resiliency | 2 | 3 | 4 | 3 | 3 | 1 | 1 | 1 | 1 | 3 | 1 | 1 | 3 |
| Strength | 3 | 3 | 4 | 3 | 3 | 2 | 3 | 3 | 3 | 4 | 3 | 1 | 3 |
| Firmness | 2 | 3 | 4 | 3 | 3 | 2 | 2 | 2 | 2 | 3 | 2 | 2 | 3 |
| Tenderness | 3 | 3 | 4 | 1a | 1a | 1b | 1b | 1a | 1a | 3 | 1b | 1b | 1a |

In all instances in the above data the drying times of the confections of this invention were materially less than those of the control which used the exact same confection formulation but without the partial replacement of its sweetening constituent with hydrolysate. In many instances, the confections of this invention had drying times of about 24 hours or less while the control had a drying time of 55 hours. Such improved drying characteristics result in substantial savings in time, money, production space, and tray equipment. In many instances all or some of the characteristics of resiliency, strength, firmness, and tenderness of the confections of this invention are superior to those of the control. In this respect the replacement of 30% of the sucrose in confection A resulted in a gum confection product which was not only excellent, but superior in every way to the control. In those confections of this invention wherein the tenderness and resiliency tests are rated poor, it should be understood that though of corn syrup, sucrose and mixtures thereof, and a starch hydrolysate having a D.E. from about 5 to about 15 and a descriptive ratio of at least about 2.0, said starch hydrolysate being present in an amount from about 6 to about 60% by weight of the total weight of said hydrolysate and said sweetening constituent, said starch being present in an amount from about 10% to about 15%, by weight.

6. A gum confection according to claim 5 wherein said starch hydrolysate is present in amount of about 12% by weight of the total weight of said hydrolysate and said sweetening constituent.

7. A gum confection according to claim 5 wherein said starch hydrolysate has a D.E. from about 10 to about 13.

8. A method of making a gum confection comprising the steps of preparing a dispersion by admixing water, sweetener selected from the group consisting of corn syrup, sucrose and mixture thereof, and a starch hydrolyzate having a D.E. from about 5 to about 15 and a descriptive ratio of at least 2.0, said hydrolyzate being in amount from about 6 to about 60% by weight of the total weight of said hyrolyzate and said sweetener.

9. The method according to claim 8 wherein the sweetening constituent contains about 12% by weight of the starch hydrolysate.

10. The method according to claim 9 wherein the starch hydrolysate has a maximum moisture content of about 5% and a D.E. from about 10 to about 13.

11. The method according to claim 10 wherein the starch hydrolysate is a syrup containing about 76% solids and having a D.E. from about 10 to about 13.

12. The method according to claim 11 including the step of drying the confection in less than 24 hours at ambient temperature.

References Cited
UNITED STATES PATENTS

| | | | |
|---|---|---|---|
| 2,678,276 | 5/1954 | North | 99—134 |
| 2,726,960 | 12/1955 | Bolanowski | 99—134 |
| 3,218,177 | 11/1965 | Robinson et al. | 99—134 |
| 3,332,783 | 7/1967 | Frey | 99—134 |
| 3,490,922 | 1/1970 | Hurst | 99—142 |

JOSEPH M. GOLIAN, Primary Examiner

PO-1050
(5/69)

UNITED STATES PATENT OFFICE
CERTIFICATE OF CORRECTION

Patent No. 3,582,359                                 Dated    June 1, 1971

Inventor(s)   HAROLD EDWIN HORN AND BRUCE ALAN KIMBALL

It is certified that error appears in the above-identified patent and that said Letters Patent are hereby corrected as shown below:

Column 1, line 37, "situation" should read --situations--;

Column 2, line 33, "or" should read --of--;

Column 4, line 55, "slury" should read --slurry--;

Column 4, line 57, "cooled" should read --cooked--;

Column 6, Table 3, under the heading D.E. of acid hydrolysate Sample C "10.7" should read --10.3--;

Percent dry substance, Sample B "37.6" should read --37.5--;

Enzyme dose, Sample A, "0.06" should read --0.01--;

Final D.E., Sample A, "17.9" should read --19.7--;

Column 8, line 9, "uscrose" should read --sucrose--;

Column 8, line 14, "name" should read --same--;

Signed and sealed this 8th day of February 1972.

(SEAL)
Attest:

EDWARD M. FLETCHER, JR.
Attesting Officer

ROBERT GOTTSCHALK
Commissioner of Patents